United States Patent [19]

Brennan et al.

[11] 3,877,747
[45] Apr. 15, 1975

[54] CENTER SEAT FORWARD FOLDING COCKTAIL TABLE FOR MULTI-PASSENGER RECLINING SEAT UNIT

[75] Inventors: Edward J. Brennan, Litchfield; Rene J. Brunelle, Wolcott, both of Conn.

[73] Assignee: Universal Oil Products Company, Des Plaines, Ill.

[22] Filed: Jan. 7, 1974

[21] Appl. No.: 430,952

[52] U.S. Cl............ 297/124; 244/122 R; 297/146; 297/191; 297/232
[51] Int. Cl........................ A47f 7/70; B64d 11/06
[58] Field of Search..... 244/122 R, 118 P; 297/191, 297/142, 417, 146, 124, 450, 217, 232, 112, 113, 125

[56] References Cited
UNITED STATES PATENTS

| | | | |
|---|---|---|---|
| 2,240,748 | 5/1941 | Bak | 297/146 |
| 2,824,599 | 2/1958 | Quinlan | 297/146 |
| 3,009,737 | 11/1961 | Burnett | 297/146 |
| 3,374,032 | 3/1968 | Giudice | 297/124 |
| 3,439,889 | 4/1969 | Karlsen | 244/122 R |
| 3,468,582 | 9/1969 | Judd | 297/417 |

Primary Examiner—Trygve M. Blix
Assistant Examiner—Galen L. Barefoot
Attorney, Agent, or Firm—James R. Hoatson, Jr.; Barry L. Clark; William H. Page, II

[57] ABSTRACT

Center seat back cushion on a multiple passenger seating unit has a molded plastic table surface and arm rest portions on its back side which are hidden from view when the seat is occupied but which can be pulled forward and utilized by passengers in the adjacent seats when the center seat is not occupied. A pivoted support frame structure and linkage for the center seat back cushion unit supports the unit with the table surface in a predetermined spaced relation above the seat bottom cushion regardless of the amount of reclining movement to which the seat back unit is subjected. When the center seat back is in its seating use position, its appearance and comfort is substantially identical to the adjacent seats. When the table is being used, the occupants of the adjacent seats retain their privacy relative to rearward seats since the center seat back and headrest are independent of the movable cushion-table assembly.

9 Claims, 4 Drawing Figures 3,877,747

CENTER SEAT FORWARD FOLDING COCKTAIL TABLE FOR MULTI-PASSENGER RECLINING SEAT UNIT

BACKGROUND OF THE INVENTION

Since commercial aircraft generally operate at less than full capacity, many airlines have attempted to make traveling more comfortable for coach passengers by providing inside armrests that can be removed or pivoted to a storage position when the plane is not full, thus giving additional hip room. Certain airlines have also provided center seats which have a two piece back wherein the upper portion of the seat back, including the headrest portion, can be pivoted forward to rest on the seat bottom cushion. In the forward position, a table surface affixed to the back of the headrest can be used to support beverages or small snack trays. Although the aforementioned type of seat has become very popular, it does have certain disadvantages which some passengers find objectionable. For example, when the pivoted table-headrest portion is in its upper position, the table surface is exposed to the view of the passengers in the next row. If the table is not clean it is of course not pleasant to look at. The table portion of the headrest is fairly thin and the side edges of the table are fairly sharp, making them somewhat uncomfortable for adjacent passengers attempting to use them as armrests when the regular armrests are pivoted out of their use position. Since the entire upper portion of the seat back is moved forward when the table is being used, the adjacent seat occupants lose considerable privacy relative to persons in rearward seats and also forward seats, who can not only overhear conversations more easily but can also view papers which might be confidential. Where the movable seat portion carrying the table is pivoted to the seat back rather than the seat frame, a grabbing of the seat back by an occupant of a rearward seat as he arises from his own seat causes a jerking movement of the folded down table, and a possible spilling of drinks placed thereon. There is also a disadvantage to prior art seats from an esthetic viewpoint in that the passenger compartment looks sloppy to a person walking down the aisle when some seat backs are short and others are tall. Also, the center seat backs have a considerably different shape and appearance than the backs of the adjacent seats.

SUMMARY

It is among the objects of the present invention to provide a center seat fold-down cocktail table for a multipassenger seating unit which has all of the advantages and more of the prior art structures but none of the disadvantages.

The improved composite table-cushion assembly is mounted on a metal frame carried by a pair of spaced arms. The arms are pivotally mounted to the same pivot axis as the reclining seat back and can thus be moved independently of the seat back. This mounting prevents jerking of the table by movement imparted to the seat back by a rearwardly seated passenger. It also allows the center seat back to be reclined when the table is down to provide additional shoulder and elbow room for passengers in the adjacent seats. A pin on each arm engages a curved slot carried by the seat frame or base and provides a stop means to limit forward movement of the arms so that the table will be suspended horizontally in a cantilever fashion over the seat bottom cushion during use. Since the table is suspended, the entire area of the seat bottom cushion beneath it will be available for papers and books which the seat occupants might wish to place there for ready access during the flight. When the center seat is occupied, or there is no need for the table, the table is pivoted upwardly and pressed against the forward surface of the seat back frame where it is hidden from view. The seat back cushion is affixed to the under side of the table and the upholstery material covering it surrounds the spaced arms to hide them from view. No latches are required to hold the seat back cushion in its seating position since the weight of the rearwardly inclined metal arms and frame structure and the friction between the upper edge of the resilient back cushion and the lower edge of the resilient headrest which is fixed to the seat back frame is sufficient to retain the rear cushion and table in contact with the seat back. Since the table surface is preferably formed of thin vacuum formed plastic, the table and its underlying frame take up very little space. Thus, a back cushion of a thickness equal to or perhaps only slightly less thick than the back cushions for the adjacent seats can be used to insure the comfort of a center seat passenger. The side portions of the plastic table member are preferably gently curved away from the plane of the table surface to form armrest portions which are far more comfortable to passengers in adjacent seats than the relatively sharp edges of prior art tables.

Although the support structure for the cantilevered table is strong enough to support a 250 pound loading on the table, the table-back cushion assembly can be further pivoted into contact with the seat bottom cushion by manually removing a pair of stop pins which otherwise limit the forward movement. This operation is only done when it is desired to move the seat backs to a storage position overlying the seats when the plane is not being used by passengers.

DESCRIPTION OF THE PREFERRED EMBODIMENT

Figure 1:
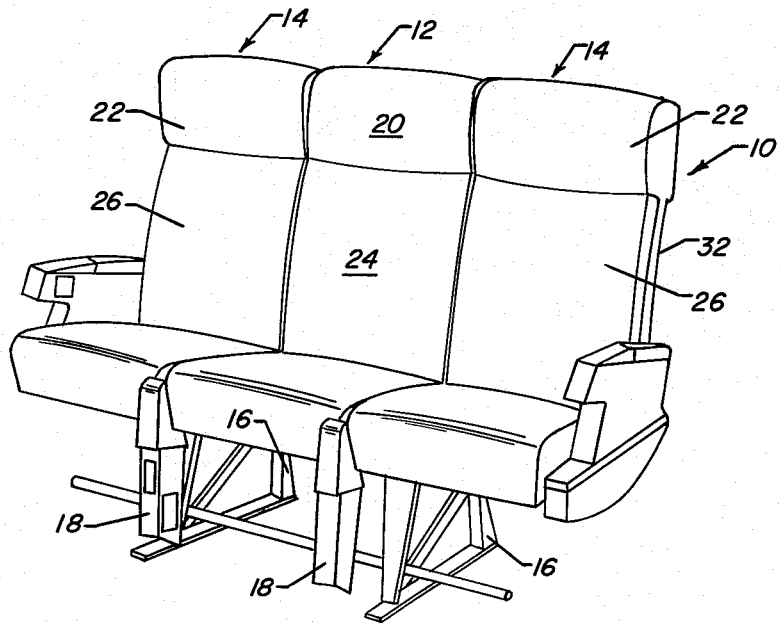
FIG. 1 is a perspective view of a seating unit with the center seat fold-down cocktail table in its stored position.
Figure 2:
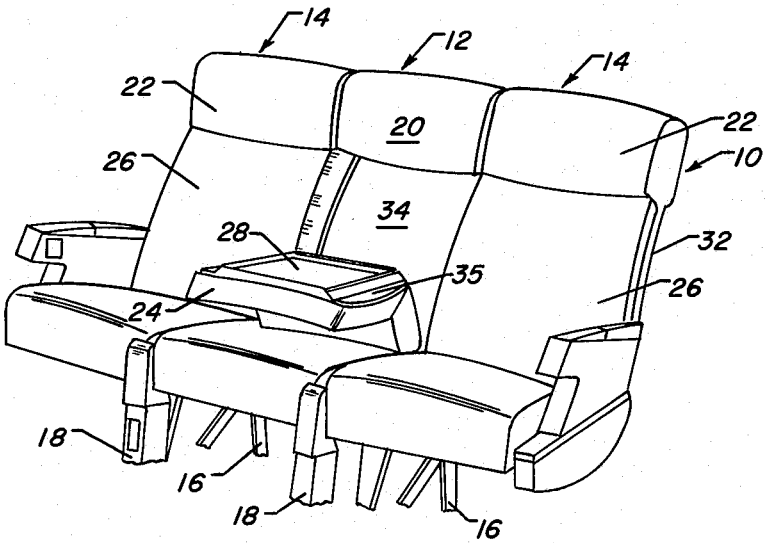
FIG. 2 is a perspective view of the seating unit of FIG. 1 with the fold-down cocktail table in its use position.

Referring to FIG. 1, a passenger seating unit indicated generally at 10 includes a center seat portion 12 and a pair of adjacent side seat portions 14 all carried by a frame 16 which is adapted to be fastened to the floor. A pair of armrest members 18 are pivotally mounted to the seat frame 16 for movement between the storage position shown and their operative positions (not shown). The seat 12 includes an upper headrest portion 20 which is substantially identical to the side seat headrest members 22. The center seat back cushion 24 has an identical appearance to the side seat back cushions 26 when it is used for seating as in FIG. 1. However, when no passenger is occupying the center seat the cushion 24 and a table surface 28 attached to its rear surface can be pulled forward and downward away from the reclining seat back member 32. Since the seat back member 32 is covered with a panel of upholstery material 34 which matches the material covering the back cushion 24, the back of the center seat matches the adjacent seats when the table is in use.

Table surface 28 is preferably made of molded plastic and includes gently curved armrest portions 35 at its sides which may be used by the passengers in side seats 14 when the armrests 18 are in their storage position. The table surface 28 is fastened to a table frame flange 36 which is mounted by a pair of table arm pivot pins 38 to a pair of pivot arms 40 which are rather rigidly tied together by a lower torsion bar 42 and an upper torsion bar 44. The pivot arms 40 are mounted for limited pivotal movement about pivot pins 48 carried by brackets 50 which are welded to tubular frame member 52. A link member 58 having a slot 60 is pivotally mounted at one end to table frame flange 36 by means of pivot pins 62. A stop pin 64 carried by each of the pivot arms 40 passes through the slot 60 and provides a stop for the link 58 which holds the table surface 28 in a horizontal position when the pivot arms 40 are moved to their forward-most position. When the table 28 is pivoted to its vertical storage position, slot 60 slides down over stop pin 64 until link 58 is in vertical alignment with arm 40.

Figure 3:
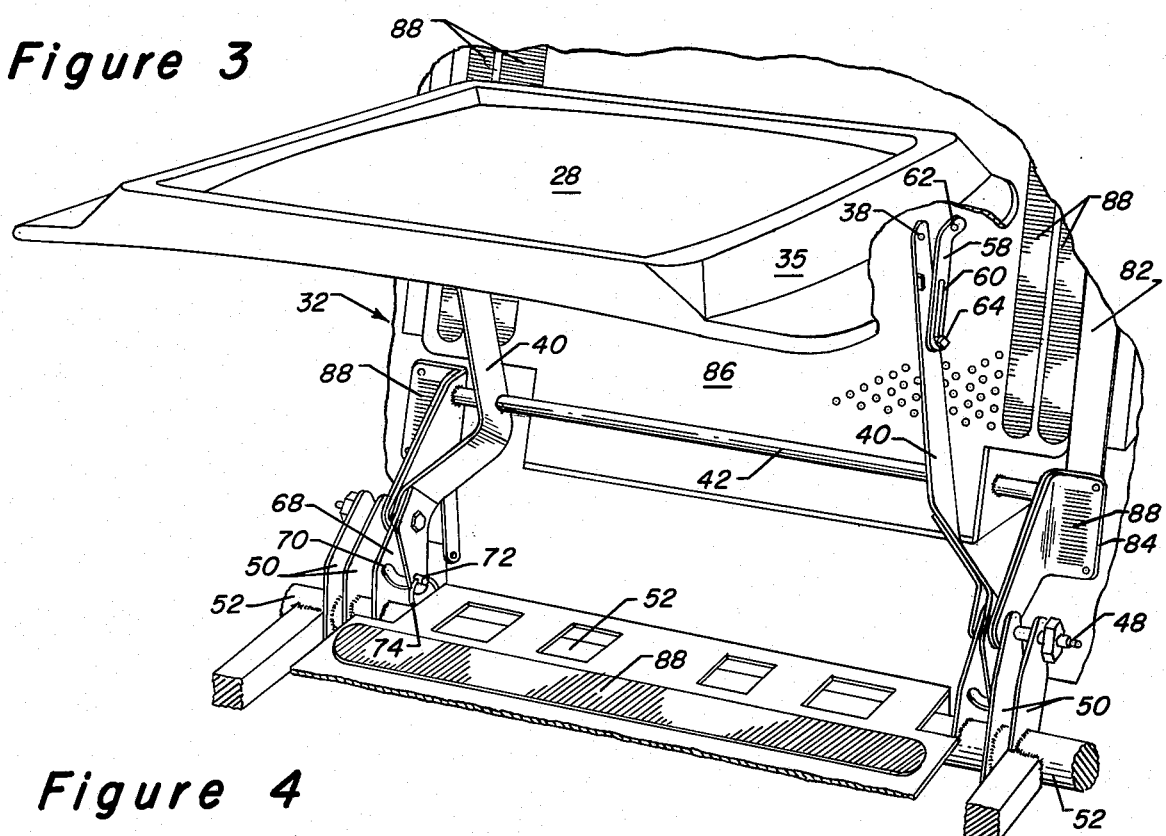
FIG. 3 is a perspective view of a portion of the seating unit of FIG. 2 with all upholstery and cushioning material removed.
Figure 4:
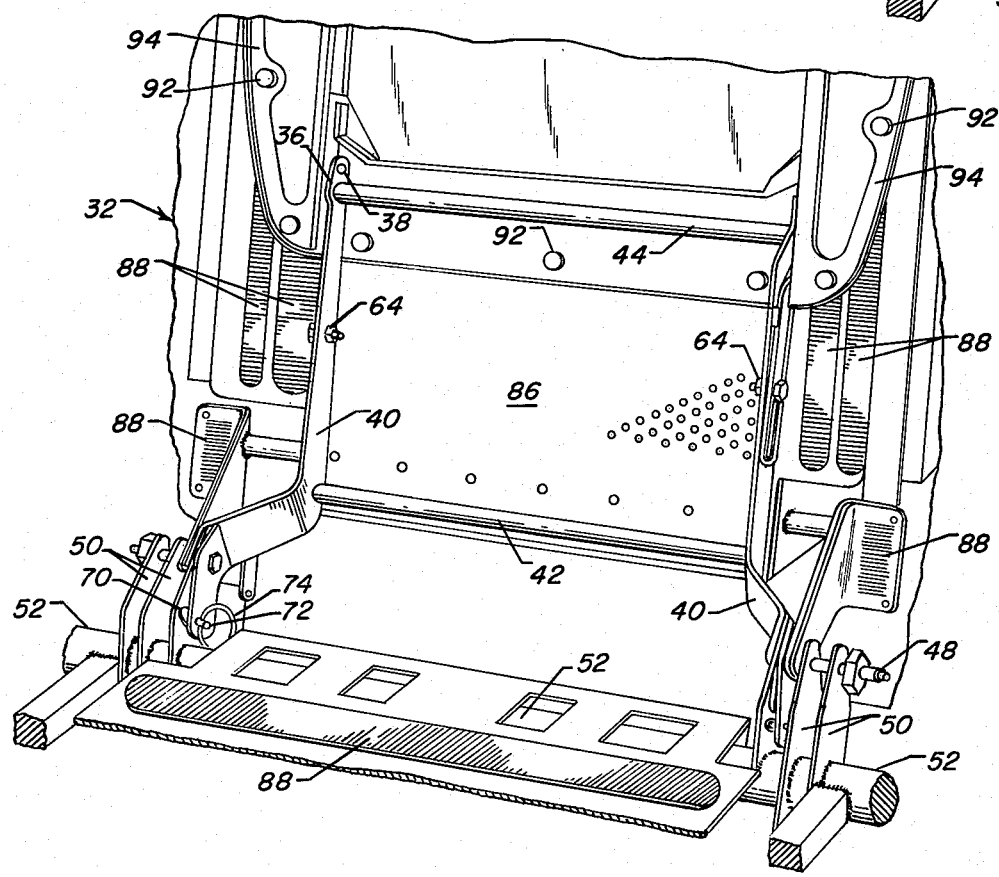
FIG. 4 is a perspective view similar to FIG. 3 but with the table in its storage position.

The movement of arm 40 to its forward position shown in FIG. 3 is permitted by slotted bracket member 68 which is supported at one end by pivot pin 48 and at its other end by tubular frame member 52. The bracket 68 contains a slot 70 which cooperates with pin 72 carried by pivot arm 40. The rearward end of the slot 70 determines the forward-most position of the pivot arm 40 while the forward end of the slot is positioned so as to allow the seat back cushion 24 to pivot rearwardly with the seat back 32 to its maximum reclining position. There is no necessity for latching the seat back cushion 24 to the seat back 32 since the members are always tilted slightly rearwardly and furthermore, since there is some degree of frictional contact between the seat back cushion 24 and the headrest portion 20. Occasionally, when the aircraft is not being used for passengers it is desirable to "break" the seat backs forwardly so that they overlie the seat bottom cushions. In order to permit additional forward movement of the cushion 24 and table 28 in such a situation the stop pin 72 may be removed from engagement with the slot 70 by pulling on pull ring 74.

The seat back 32 comprises a frame portion 82 carried by bracket members 84 which are pivoted to pivot pins 48. A perforated metal panel 86 forms the major portion of the reclining back member 32. Stripes 88 of hook and loop fasteners of the type commonly sold under the trademark "Velcro" are cemented to the rear panel 86 and to the brackets 84 for anchoring the upholstery material which is fastened to the strips 88 by complementary hook and loop fastener strips. The portion of seat back cushion 24 which is directly forward of table surface 28 is attached to headed fastener members 92 which protrude from the table frame side portion 94. Fastening is achieved by cementing a thin metal plate (not shown) to the rearward surface of the foam cushion 24. The metal plate is preferably notched on its edges so that it can be slightly bowed and snapped in place under the headed fasteners 92.

We claim as our invention:

1. In a multi-passenger reclining seat unit having a base supporting at least three seat cushions and means on the base for pivotally mounting at least three individually adjustable reclining seat back members, each of said seat back members having a cushioned headrest portion affixed thereto, the improvement comprising a back support cushion for an intermediate seat mounted for movement relative to said base, either with, or relative to the seat back member for said intermediate seat, said back support cushion having an upper and lower portion, said upper portion being mounted to said lower portion for pivotal movement relative thereto and said lower portion being mounted on a frame for pivotal movement relative to said base said back support cushion being pivotable between a generally vertical seating use position in contact with its seat back member and a generally horizontal non-seating use position forward and away from the seat back wherein the upper portion of said back support cushion is positioned spaced immediately above and in generally parallel relationship with its associated seat bottom cushion and the lower portion of said back support cushion is at an angle relative to said upper portion, a table surface being affixed to the rear surface of said upper portion of said back support cushion for said intermediate seat, said table surface being adapted to be hidden from view and in contact with its associated seat back member in its storage position when said seat back cushion is in its seating use position, said table surface being useable as a table by occupants of adjacent seats in said seat unit when said seat back support cushion is in a forward non-seating use position.

2. A seat unit in accordance with claim 1 wherein said pivotally movable frame is mounted for movement about the same pivot axis on the base as the seat back members.

3. A seat unit in accordance with claim 2 wherein said pivotally movable frame includes a pair of elongated, spaced apart, interconnected arms which are pivoted to said base, said arms having stop means thereon cooperating with stop means on the base for limiting the forward movement of the frame and the table surface thereon.

4. A seat unit in accordance with claim 3 wherein the stop means on each of said arms comprises a pin projecting therefrom, the stop means on said base comprising an angular slot for receiving said pin.

5. A seat unit in accordance with claim 4 wherein said pins are removable to permit said arms to move further forward.

6. A seat unit in accordance with claim 1 wherein said table surface comprises a portion of a molded plastic member which also includes arm rest portions on its sides.

7. A seat unit in accordance with claim 3 wherein said pivotally movable frame further includes a table surface support pan portion pivotally attached to said pivoted arms at the remote ends thereof, a pair of link members pivotally mounted at one end to said support pan portion at a distance from said pivoted arms, the opposite ends of said link members being mounted for a predetermined degree of sliding movement relative to said arms, said link members forming a rigid triangular relationship with said support portion and arms when said table surface is in its horizontal non-seating use position, and said link members being generally parallel to said arms and said intermediate seat back member when said table surface is in its stored seating use position.

8. A seat unit in accordance with claim 7 wherein said arms are interconnected by a pair of spaced torque tubes.

9. A seat unit in accordance with claim 1 wherein said back support cushion for an intermediate seat has approximately the same thickness as adjacent cushions, said table surface being hidden from view and all of said seat back members having a substantially identical appearance when said intermediate back support cushion is in its seating use position.

* * * * *